H. O. PUTT.
COLLECTOR AND DISTRIBUTOR SYSTEM FOR HIGH TENSION MAGNETOS.
APPLICATION FILED JUNE 16, 1920.
1,416,507.
Patented May 16, 1922.
4 SHEETS—SHEET 1.
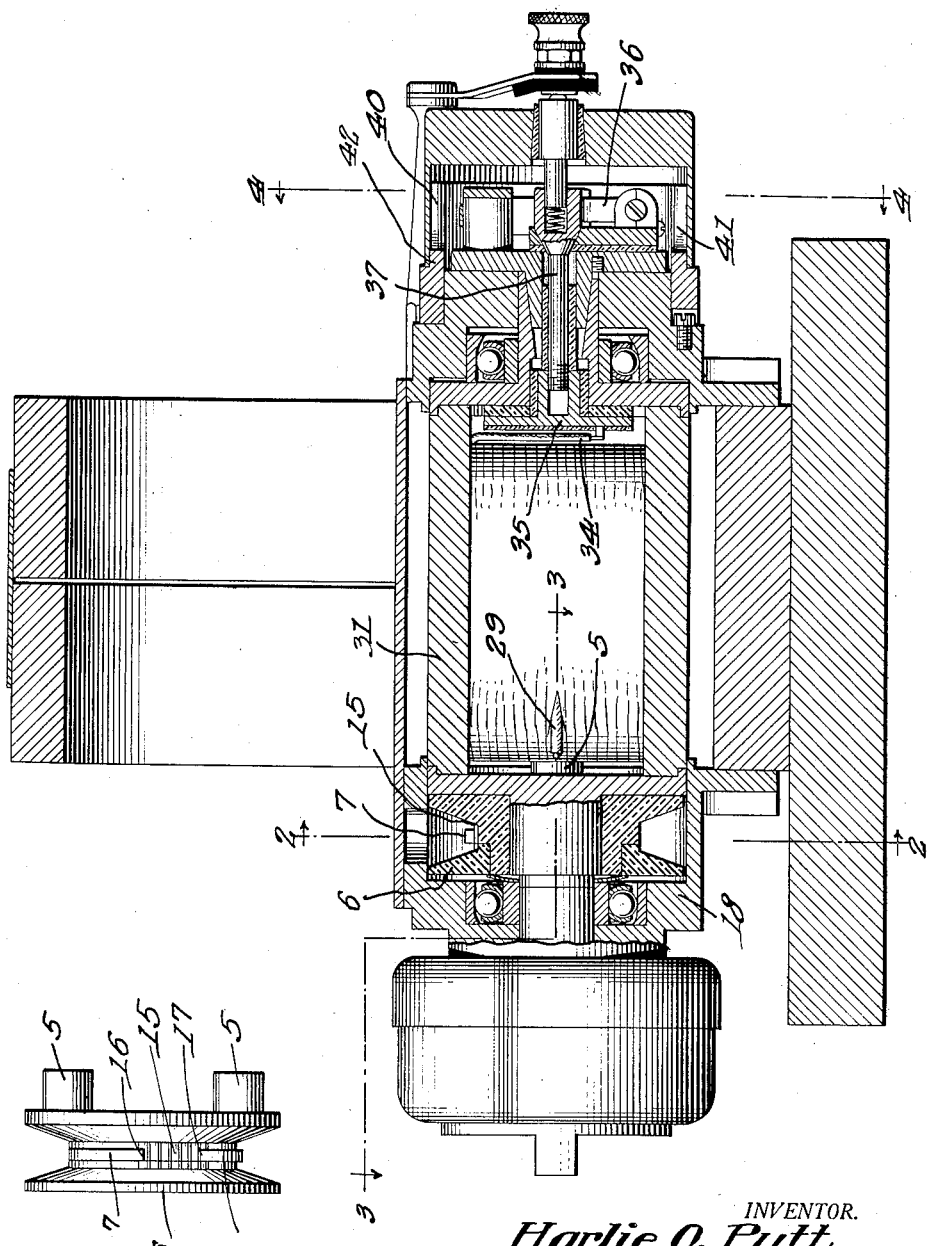
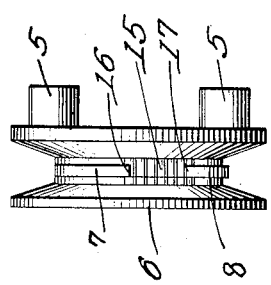
INVENTOR.
Harlie O. Putt
BY
Lester L. Sargent.
ATTORNEY.

H. O. PUTT.
COLLECTOR AND DISTRIBUTOR SYSTEM FOR HIGH TENSION MAGNETOS.
APPLICATION FILED JUNE 16, 1920.
1,416,507.
Patented May 16, 1922.
4 SHEETS—SHEET 2.
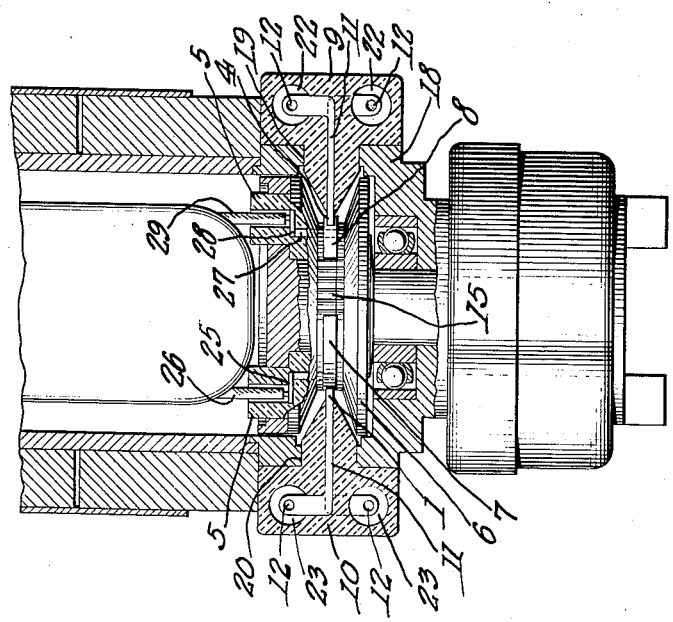
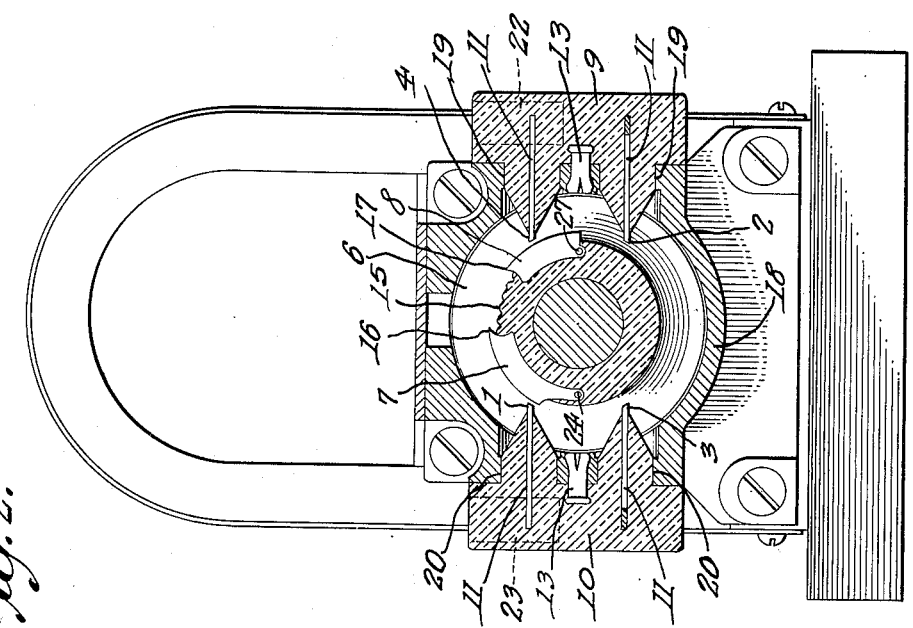
INVENTOR.
Harlie O. Putt
BY
Lester L. Sargent.
ATTORNEY.

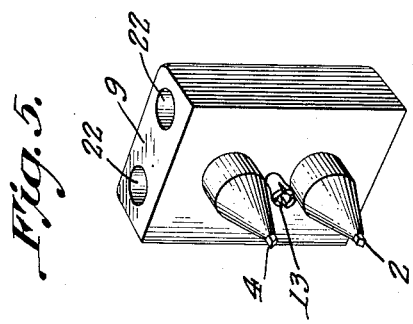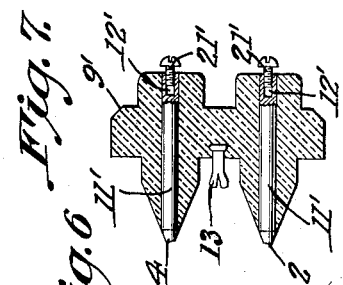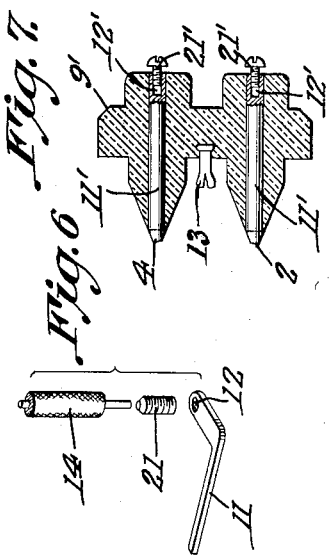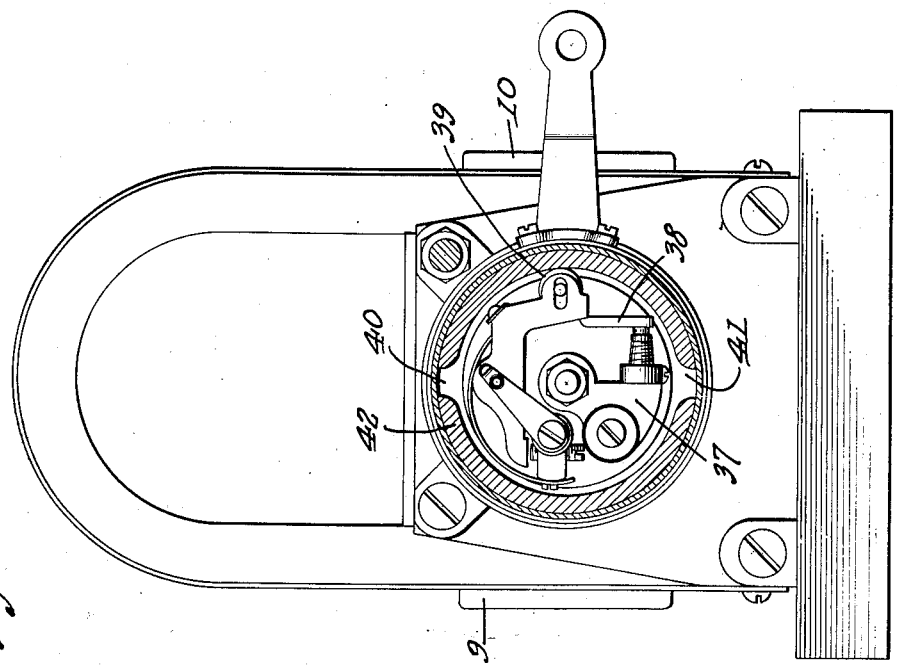

H. O. PUTT.
COLLECTOR AND DISTRIBUTOR SYSTEM FOR HIGH TENSION MAGNETOS.
APPLICATION FILED JUNE 16, 1920.
1,416,507.
Patented May 16, 1922.
4 SHEETS—SHEET 4.
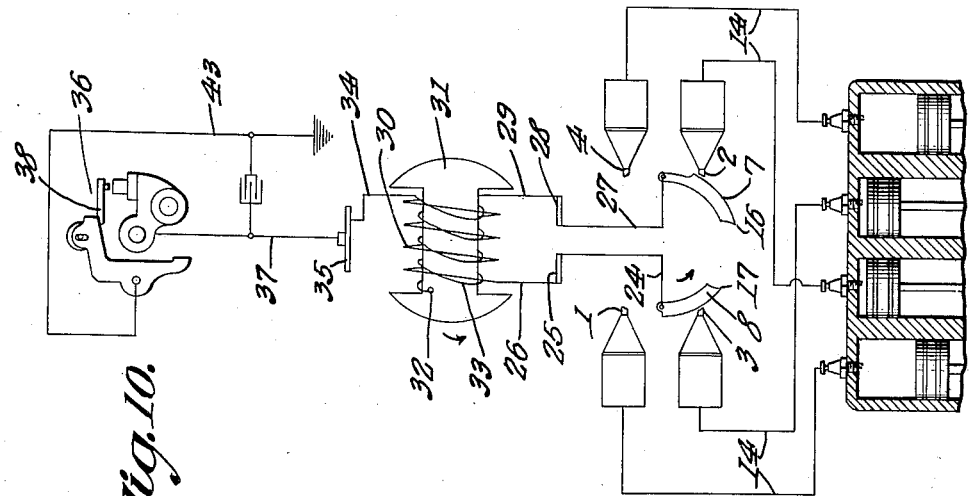
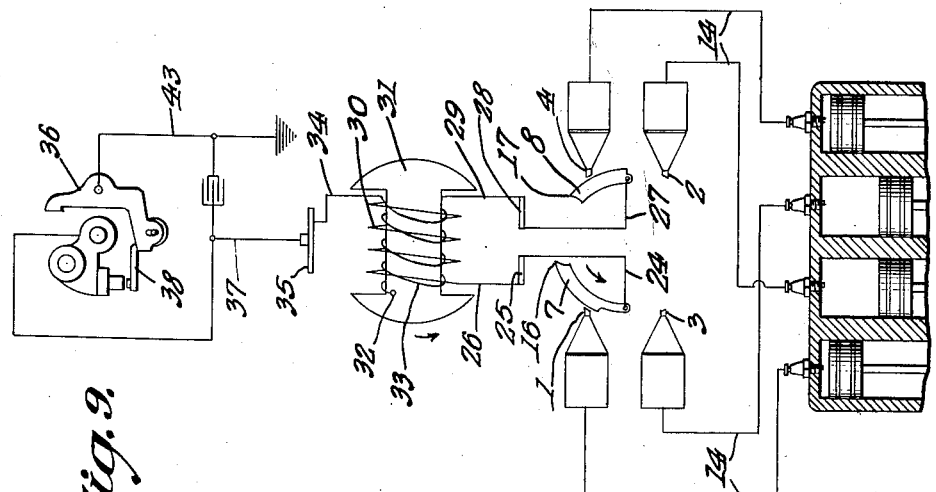
INVENTOR.
Harlie O. Putt
BY
Lester L. Sargent
ATTORNEY.

UNITED STATES PATENT OFFICE.

HARLIE O. PUTT, OF ELKHART, INDIANA, ASSIGNOR TO ACE MAGNETO COMPANY, OF GOSHEN, INDIANA, A CORPORATION OF INDIANA.

COLLECTOR AND DISTRIBUTOR SYSTEM FOR HIGH-TENSION MAGNETOS.

1,416,507. Specification of Letters Patent. Patented May 16, 1922.

Application filed June 16, 1920. Serial No. 389,487.

*To all whom it may concern:*

Be it known that I, HARLIE O. PUTT, a citizen of the United States, residing at Elkhart, in the county of Elkhart and State of Indiana, have invented a new and useful Collector and Distributor System for High-Tension Magnetos, of which the following is a specification.

The object of my invention is to provide a novel distributing system, adapted especially to a four cylinder high tension magneto, involving a structure of extreme simplicity as regards number of parts and functioning of same, accessibility, and low manufacturing cost.

It is further my object to provide a structure capable of extreme flexibility of application to various ignition conditions or requirements, as hereinafter specified.

It is further my object to provide a structure which shall not possess the defects common to the orthodox type of magneto, as hereinafter pointed out.

In the ordinary type of magneto, a distributor is generally employed on two and four cylinder instruments. This distributor is used to distribute the spark to the proper spark plug in its proper firing order, in a manner well known to those skilled in the art. The conventional distributor rotates at half engine speed for a four cylinder magneto, necessitating a two to one gear ratio with the armature of the magneto, also a bearing and other parts, which materially increase the cost of production of such distributors.

Furthermore, these distributor types of magnetos usually employ carbon brushes, or a brush to travel over the distributor path, which path is composed of alternate sections of an insulating medium and a conducting medium, which has the effect of depositing carbon particles in or along the insulating medium between the conducting mediums, which condition causes leakage and back firing.

It is the general practice in the distributor type of magneto to employ a collector ring on the armature, which has a continuous metallic insert moulded into the ring with which a carbon collector brush is always in contact. The carbon dust or wearings which are bound to accumulate over the surface of the di-electric composing the moulded substance of the ring is sure to cause leakage of the high tension current, and ultimately a burn-out.

Furthermore, wherever a continuous circuit is established from the high tension winding on the armature to the spark plug, the efficiency of ignition is impaired if the plug points are partially short-circuited with carbon or other medium, because of the choking or inductive effect on the primary winding of the armature, resulting in a materially weakened spark at the defective plug points, thus causing missing or poor ignition.

It is a matter of record that the United States Bureau of Standards recommend the insertion of a small air gap in the high tension circuit, in order that the partial short circuiting of spark plug points may not interfere with the full value of induction in the windings of coil or armature, which results in a spark of increased intensity to consume or dislodge the carbon accumulation on the plug points.

The difficulty in the way of inserting a small gap in the existing designs of magnetos or ignition systems is manifold, in that they cannot be made fool proof and of necessity must be stationary, which does not provide for proper radiation of heat, which materially affects the resistance of the gap, and gives a variable efficiency.

It is my object to provide a structure, especially adaptable to an ignition dynamo or magneto, from one to four cylinders, having one or more air gaps interposed between the high tension coils and the spark plugs, without any moving contacts in the high tension circuit, said air gaps, being disposed in a manner conductive to a maximum radiation of the heat produced at said gaps, and enclosed in a manner to make them dirt, water, and fool proof.

It is further my object to provide a structure capable of effecting the distribution of the spark to the proper spark-plugs of a four cylinder motor, without the use of the customary gears, brushes, distributors, etc., commonly employed, and without the necessity of increasing the dimensional length of the magneto, thus making my structure interchangeable with any standard distributor type magneto, a factor which I consider of great importance.

My structure consists of a novel form of distributing ring mounted on the armature of the magneto in the customary location, and revolving with the armature. This ring is preferably moulded in the usual manner, and is provided with two metallic inserts argularly disposed a definite degree in relation to each other, and to the collector points with which they come in conjunction. These inserts, or sectors are preferably made of an alloy, possessing non-erosive qualities but may be of any suitable material, and are provided with means for connection to the secondary winding, in the customary manner, and a collector point or points, which, in the four cylinder type, are double, that is, two collector points on each side of the magneto, and positioned so as to bring the ring sectors in conjunction with the two opposed top collector points during a part of one half rotation of the ring, and in conjunction with the two bottom collector points during the other half rotation of the ring or armature.

The collector points, or collectors, are preferably moulded of suitable di-electric material, and are provided with metallic inserts which are moulded in position, and which are designed to act as collector points, and distributor terminals combined, affording means of connecting the ignition cables to said collector points or inserts in a manner to prevent their dislocation by vibration or accidental means, said inserts or collector points are preferably made of non-erosive or other suitable material, and the combination of distributor ring and collector points so disposed as to effect the proper distribution of ignition current to the respective spark plugs in their proper sequence or firing order, without any actual contact between the said distributor ring inserts or sectors and the collector point inserts.

This structural arrangement provides the desired air gap, maximum radiation of heat at said gaps, due to rapid rotation of ring sectors, and consequent elimination of all moving contacts and wearings, thus reducing leakage and burn-outs to a minimum, besides producing an extremely simple accessible and efficient arrangement of very low manufacturing cost as compared to the distributor type of magnetos heretofore devised.

I attain the objects of my invention by the mechanism illustrated in the accompanying drawings, in which—

Figure 1 is a longitudinal section of the invention;

Fig. 2 is a transverse section on line 2—2 of Fig. 1;

Fig. 3 is a section on line 3—3 of Fig. 1;

Fig. 4 is a transverse section on line 4—4 of Fig. 1;

Fig. 5 is a detailed perspective view of the collector assembly;

Fig. 6 is a detailed perspective view of members 11, 21 and 14;

Fig. 7 is a detailed sectional view of a modified form of collector assembly;

Fig. 8 is a detailed side elevation of the distributor ring;

Fig. 9 is a diagrammatic view showing the position of the various elements when the piston 1 is on compression and piston 4 on exhaust; and Fig. 10 is a similar diagrammatic view showing the position of various elements when piston 2 is on exhaust and piston 3 on the compression stroke.

Like numerals designate like parts throughout the several views.

I provide combined ring housing and bearing support 18, as commonly employed, with the exception that it is provided with openings oppositely opposed to permit of the insertion of the collectors 9, 10, 19 and 20, as shown. The collectors are provided with spring fasteners 13, which hold collectors to the distributor housing, which are moulded integral with each of the collectors 9 and 10, and extend inwardly to the inner surface of the ring housing 18 through suitable openings or holes provided for the purpose. These fasteners 13 may be of any suitable form or character, but preferably of the form illustrated in Figs. 5 and 7, being partly hollow, and slotted so as to permit of an expansion effect within the opening provided for them, which permits of the easy insertion of the whole collector assembly, or its equally easy removal without tools, and yet not permit its displacement by vibration or unintentional causes.

The collector assembly is moulded with holes or apertures 22 and 23, extending below the insert member 11, providing for the insertion of the cable 14 (Fig. 6), and its electrical connection with the insert member 11. These apertures 22 and 23 are sufficiently larger than the cable 14 used to permit of screwing the threaded thimble 21 into the threaded opening 12 of the insert 11, thus ensuring a perfect and permanent connection.

The ring inserts or sectors 7 and 8 are preferably punched out of suitable material and of the form shown in Fig. 2, and securely moulded in the dielectric substance of the distributor ring or spool 6, forming the hub or body portion, as illustrated in Fig. 8, having a ribbed or corrugated surface 15 between the sectors 7 and 8, as shown in Fig. 8. The purpose of this corrugated surface 15 is to diminish the skin or corona effect, well known to those skilled in the art. The extremities of the sectors 7 and 8 terminate in points 16 and 17 respectively, spaced a suitable distance apart to form a safety gap of a fixed and foolproof character, between the two oppositely charged sectors, and designed to protect the windings in case the ignition cables become disconnected from the spark plugs.

As illustrated in Figs. 9 and 10, I provide a conductor 24 from sector 7 to contact 25, mounted within sleeve 5, to be engaged by one end 26 of armature winding 30. I further provide a similar conductor 27 secured to sector end and connected to contact 28, mounted within opposite sleeve 5, and arranged to be contacted by opposite end 29 of armature winding 30. 30 designates the secondary winding.

One end, 32, of the primary winding 33 is grounded on the armature core 31 in the customary manner, while the other or remaining end 34 is connected to the interrupter mechanism or circuit breaker 36, by means of a conductor 37 which is releasably secured to the annular threaded portion of insulated plate 35, which is in electrical contact with the opposite end 34 of primary winding 33. Referring to Fig. 4, interrupter mechanism 36 includes a movable arm 38, a roller 39 bearing on cams 42 and which intermittently moves into cam slots 40, and 41 oppositely disposed, to interrupt the circuit at predetermined times. I provide a conductor 43 which grounds the primary winding 33. The mechanism is equipped with the usual contact points and condenser.

The secondary or high tension winding 30 is wound over the primary winding 33 and thoroughly insulated therefrom. It has both terminals of the said secondary coils 30 brought out and connected to the respective sectors 7 and 8 of my distributor ring 6, which is mounted on the armature shaft and rotates therewith, in the usual manner. I claim no originality with respect to the arrangement of this circuit, but merely illustrate it to more clearly explain the functioning of my device.

Owing to the fact that both high tension terminals are connected to the two ring sectors, a spark will be produced at each of the two top collector points 1 and 4, simultaneously, and also at the two bottom collector points 3 and 2, simultaneously; that is, two sparks will occur in synchronism each half revolution or 180 deg. apart, while with respect to either collector assembly individually, one spark would occur each half revolution of the armature, or 180 deg. apart. In other words, assuming the direction of rotation to be from right to left as indicated by the arrow (see Fig. 9), sector 7 being opposite collector point 1, and sector 8 being opposite collector point 4, current would be delivered to each of these two points simultaneously, providing the interrupter contacts were timed to open at this instant, and likewise one half revolution or 180 deg. later, sector 7 would be opposite collector point 2 and sector 8 opposite collector point 3 and current would be delivered to these two points simultaneously. But sector 7 will not deliver current to collector points 3 or 4, nor will sector 8 deliver current to collector points 1 or 2, because the interrupter points would be closed while these said factors are in conjunction, and there would be no magnetic change, or inductive value in the armature winding at this time.

It is understood that the length of each sector is so proportioned as to permit of its proximity to the proper collector point during the comparatively short interval of time that the interrupter points are open and to permit oscillation of the interrupter mechanism a definite degree for spark advancing purposes familiar to those skilled in the art.

As illustrated in Fig. 2 of the drawings, the collector points 1 and 4, and 3 and 2, are never in contact with the sectors 7 and 8, but a gap or short space intervenes. This air gap in practice is approximately .005 inch, and its function is to intensify the high tension current or spark at the spark plug point. It is universally understood that when the circuit of a high tension current is separated by suitable air gaps that a resultant intensification of the delivered energy is effected. To produce this effect with stationary air gaps would cause the intervening air in the gaps to become heated with a consequent lowering of the ohmic resistance of said gap, especially when the sparks occur in rapid succession or when the energy transferred in maximum—as in a high tension magneto—and this lowering of gap resistance would in turn affect or decrease the value of intensification. Inasmuch as a high tension (high voltage) current will pass through heated air with much greater ease than through cool air, in order to maintain a relatively constant value of resistance of the gap the heat caused by the passage of the current must be radiated. My structure accomplishes this automatically by the rotation of the projecting ring sectors fanning the collector points, thus dissipating the heat by the rapid circulation of air. The degree of radiation is proportional to the speed of rotation of the sectors. The higher the speed of the armature (within practical limits) the greater the value of the generated current; hence more heat at the gaps, but radiation also increases with the speed.

The firing order of the usual type of four cylinder, 4 cycle motor, is 1—3—4—2 (some-times it is 1—3—2—4), and when No. 1 piston is on top dead center compression, then No. 4 piston will be top dead center exhaust—that is, when No. 1 piston has compressed a charge of gas ready to fire, No. 4 piston has just completed its exhaust stroke. Likewise, when No. 3 piston is on top dead center, compression, No. 2 is on top dead center exhaust, and, continuing the sequence, when No. 4 is on compression, No. 1 is on exhaust, and when No. 2 is on compression, No. 3 is on exhaust.

Referring to Fig. 7, there is illustrated a modified form of collector assembly having a modified insert 11′, having a threaded opening 12′, to which a screw 21′ is attached, as shown. Collector 9′ is made integral with the insulation elements containing insert 11′.

The operation of my device is as follows:

Referring to Fig. 1, assume that a suitable cable is run from collector 1 to the spark plug in No. 1 cylinder, also from collector 4 to the plug in No. 4 cylinder, and also from the collectors 3 and 2 to the respective plugs in cylinders number 3 and 2, and assuming the magneto armature is rotating in the direction indicated and that the interrupter contact points are just about to open. Then if No. 1 piston is on compression, the resultant spark at that plug will ignite the charge, while the spark at No. 4 plug, which occurs simultaneously, will merely tend to clean or scavenge the points of said plug, there being no gas in No. 4 cylinder.

One-half revolution or 180 degrees later, No. 3 is fired and No. 2 plug is scavenged; and on the next half rotation No. 4 is fired and No. 1 is scavenged, and on the next half rotation No. 2 is fired and No. 3 is scavenged. In other words, each time a plug is fired on a working stroke, another plug is fired on an exhaust stroke simultaneously, of course assuming that the magneto armature is rotating at crank-shaft speed, and is properly timed to the motor which it is to fire.

The idea of firing a plug on the exhaust stroke is not new, having been practiced by several ignition concerns for some time, but the various methods employed were in the majority of cases unsatisfactory. However, the results obtained by firing a plug on the idle or exhaust stroke of a piston is conducive to better ignition because of the cleaning or scavenging effect produced on the points of the plugs by the action of the spark at practically atmospheric pressure, especially with an ignition system having an air gap in the high tension circuit, which gap will materially increase the intensity of the spark at the plug points under adverse conditions—as for instance, when said plug points should become partially short-circuited by carbon, as hereinbefore mentioned.

The air gaps in my invention perform another important function. If a spark plug point becomes partially or wholly short circuited with carbon—due to poor mixture of gas and air, or other causes—thereby reducing the ohmic resistance of the spark plug; and if this plug is connected to a source of high tension current supply, as in certain devices in the prior art, that is, with an uninterrupted path or conductor, the generated wave, building up from zero to maximum value, would at the start find a comparatively easy path, and this energy would be gradually dissipated through the carbon accumulation on the spark plug points, resulting in a partial ignition or none at all. This condition prevails wherever the source of the electric current is connected direct to the spark plug without intervening gaps in the circuit, a condition which is bound to grow worse the longer the device is used. In my invention the air gaps between the collector points and ring sectors—which maintain a relatively constant ohmic value—act as an impedance to the passage of the generated current wave until it reaches a point or potential capable of breaking down the resistance of not only the air gaps at the collector points but at the spark plug points as well, when the accumulated energy surges across the collector point gaps and through the spark plug points and heats or dislodges any carbon accumulation thereon; thus not only effecting a cleansing action on the spark plugs, but tending to keep them free from carbon. Furthermore, by providing a device in which there is no contact between brushes and the sectors and dielectric surface of the ring, my device does not produce any "wearings" and consequent leakage or discharge between my sectors over the surface of the dielectric between them.

Inasmuch as sector 7 is alternately in conjunction with collector points 1 and 2, and sector 8 is alternately in conjunction with points 3 and 4, when a spark is generated, it is obvious that I can fire a two cylinder four-cycle 180° motor with my four-cylinder structure by simply connecting the two respective spark plugs with any two vertically opposite, or diagonally opposite collector points, as either of these points would deliver sparks 180 degrees apart, which would fire each plug once on the compression and once on the exhaust stroke. This arrangement would necessitate the grounding of the collector points not connected up.

To illustrate, assume collector points 4 and 3 are grounded in any suitable manner, and cables are connected to the spark plugs in No. 1 and No. 2 cylinders and to the collector points 1 and 2, then the distributor sector 7 would alternately deliver current to points 1 and 2 each half revolution which would fire each plug once on the compression stroke and once on the exhaust stroke, completing the circuit back through the ground to the collector points 3 and 4, and thence to the sector 8. Likewise the same results are obtained by grounding collector points 1 and 3, and utilizing points 2 and 4, or vice-versa.

The same arrangement will fire a two cylinder, two-cycle motor, which requires a spark each revolution of the crank, or any motor that fires 180 or 360 degrees apart.

By grounding any three collector points, the remaining point can be utilized to fire a single cylinder two or four-cycle motor, or where two point ignition is desired in a two cylinder engine—that is, where there are two spark plugs installed in each cylinder, both firing simultaneously to afford quicker combustion, my structure is adaptable, by connecting points 1 and 4 to one set of plugs, and points 2 and 3 to the other set of plugs, thus firing each set simultaneously and the two sets 180 degrees apart.

All of the above applications may be made without necessitating any other changes than grounding the unused collector points and assuming magneto to be driven at engine speed.

It is understood, however, that where a strictly two cylinder magneto is desired, that I may position my ring sectors approximately diametrically opposite each other, and employ two single collector point assemblies, diametrically positioned with respect to the ring sectors, or where a single cylinder magneto is desired, that I may employ but one collector point assembly, and ground one distributor sector or arrange any combination of same without departing from the spirit of my invention.

I claim—

1. In a device of the class described, as a new article of manufacture, a spool-shaped distributing ring of insulating material having a portion of its surface corrugated, and oppositely disposed metallic inserts mounted on the distributor ring at opposite portions thereof and angularly disposed a definite degree in relation to each other and having their extreme ends spaced apart to form a safety gap, these ends being positioned on opposite sides of the corrugated portion of the distributor ring.

2. In a device of the class described, the combination of a distributor ring of insulating material mounted on the shaft of the armature, metallic sectors mounted on the distributor ring and disposed at a predetermined angle relative to each other, the ends of said sectors forming a safety gap and the sectors being in electrical connection with the secondary winding of the armature, and oppositely disposed collector points arranged to be intermittently in close proximity to but not in contact with the metallic sectors on the distributor ring as the latter revolves.

3. In a device of the class described, the combination of a distributor ring of dielectric material mounted on the shaft of the armature, metallic sectors mounted on the distributor ring and disposed at a predetermined angle relative to each other, the ends of said sectors forming a safety gap and the sectors being in electrical connection with the secondary wire of the armature, and a plurality of spaced oppositely disposed collector points positioned to be brought into close proximity but not in contact sequentially with the sectors as the distributing ring revolves, said collector points being in electrical connection with the ignition cables of an internal combustion engine, whereby to effect the proper distribution of ignition current to the respective spark plugs in their proper sequence.

4. In an apparatus of the class described, the combination of a rotatable distributor-ring element of suitable dielectric material, said element having spaced metallic inserts, and having a corrugated surface in the space between said inserts; and a collector structure comprising solid metal inserts moulded in a suitable insulating compound and forming conical elements, said solid metallic inserts being connectible with the ignition cables of an internal combustion engine, and said solid metallic inserts protruding at the apex of the conical elements and constituting gap collector points, said points being in proximity to but not in direct contact with the metallic inserts of the rotatable element.

5. In combination with the device described in claim 4, a spring fastener imbedded in the said insulation material and having its springed portion protruding therefrom to engage a suitable portion of the apparatus to permit of the easy insertion of the whole collector assembly and its equally easy removal without tools while preventing accidental displacement.

6. In a device of the class described, the combination of a combined ring housing and bearing support having oppositely disposed openings, collector elements removably insertible in said openings, said collector elements having solid metallic inserts and including means for permitting of the electrical connection of the solid metallic inserts with the ignition cables of the engine, said connection including a thimble adapted to be secured to openings of the insert members, the said insert members being mounted in the collector assembly and shaped and positioned substantially as shown, for the purposes described.

7. In combination with the mechanism described in claim 6, a distributor ring of dielectric material mounted on the armature shaft, metallic inserts in electrical communication with the secondary winding of the armature, said inserts being disposed at predetermined angles to each other and terminating in points spaced sufficiently far apart to form a safety gap, the distributor ring having a corrugated portion intervening between said points.

8. In a device of the class described, a combined ring housing and bearing support, collector elements removably mounted in opposite portions thereof, a dielectric distributor ring of spool-shape mounted on the armature shaft, metallic sectors mounted on said ring and adapted to be brought into close proximity but not in contact with the collector points of the aforesaid collector element, said collector points being disposed to project into the cut out portion of the spool-shaped distributor ring, the ends of the sector members being spaced apart to form a safety gap, and the distributor ring having a corrugated portion intervening between the points of the aforesaid sectors, the aforesaid elements being arranged and electrically connected substantially as shown and described.

9. In a collector and distributor system for high tension magnetos, the combination of a combined ring housing and bearing support, collector elements removably mounted in spaced portions thereof, a dielectric distributor ring of spool shape mounted on the armature shaft, spaced metallic sectors mounted on said ring and adapted to be brought into a proximity of approximately .005 inch gap relative to the collector points of the aforesaid collector element the ends of the sector members being spaced apart to form a safety gap, and electric circuits connecting the aforesaid collector points with the respective spark plugs of the engine, substantially as shown.

HARLIE O. PUTT.